A. J. ROUTSON.
OIL LEVEL INDICATOR AND SIGNALING DEVICE.
APPLICATION FILED APR. 27, 1918.

1,310,544.

Patented July 22, 1919.

UNITED STATES PATENT OFFICE.

ARTHUR JOSEPH ROUTSON, OF PRAIRIE DEPOT, OHIO, ASSIGNOR OF TWO-THIRDS TO JAMES H. HENDERSON AND HERBERT A. WERNER, OF PRAIRIE DEPOT, OHIO.

OIL-LEVEL INDICATOR AND SIGNALING DEVICE.

1,310,544.     Specification of Letters Patent.     Patented July 22, 1919.

Application filed April 27, 1918. Serial No. 231,155.

*To all whom it may concern:*

Be it known that I, ARTHUR J. ROUTSON, a citizen of the United States, residing at Prairie Depot, in the county of Wood and State of Ohio, have invented certain new and useful Improvements in Oil-Level Indicator and Signaling Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

In the use of explosive engines the serious results likely to follow from the absence of a sufficient quantity of lubricant in the crank-chamber of the engine are well understood. It frequently happens that the oil has disappeared without the operator being aware of the fact until damage has been done to the several bearings to be lubricated.

My invention is designed to prevent mishaps of this character, and is intended, more particularly, to furnish a device by which the amount of oil in the crank-chamber of an engine may be seen at a glance and without touching the engine, and by which, when the oil in the crank-chamber has reached such a low stage that it requires prompt attention, a signal will be given to the operator calling his attention to the deficiency.

To these ends my invention consists of the device and construction hereinafter described, and illustrated in the accompanying drawings, in which,—

Figure 1:
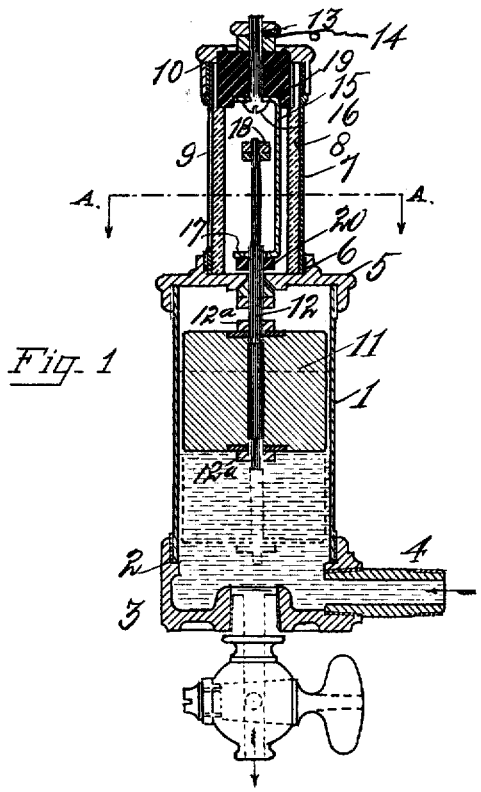
Figure 2:
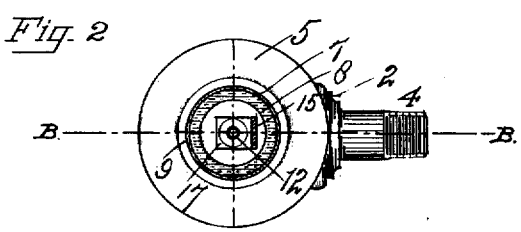

Figure 1 is a central vertical sectional elevation of my device taken on line B—B, Fig. 2, and Fig. 2 a sectional top-plan view of the same taken on line A—A, Fig. 1.

Like letters of reference indicate like parts in both views.

In the drawings, 1 is a cylindrical shell composed preferably of sheet brass, the bottom of which is seated, as at 2, in a cup-like base 3, which is provided with a suitable drain-cock. Into this base at its bottom leads one end of a pipe 4, the opposite end being threaded for connection with the crank-chamber of an engine. This connection should be at a point slightly above the lowest admissible oil level in the chamber.

5 is a metal cap having a downwardly projecting flange which fits closely over the top of the cylinder 1. The cap 5 has also an upwardly projecting flange 6 which receives with a close fit the bottom of a metal cylinder or sleeve 7, in which is fitted a glass cylinder 8. In the cylinder 7 is a sight-opening 9 through which the interior of the glass cylinder may be seen. The top of the cylinder 7 is closed by a flanged screw-cap 10. In the chamber of the cylinder 1 is a float 11 through which passes a rod 12, which extends upwardly through the cap 5 into the chamber of the glass cylinder 8. By means of the nuts 12$^a$ the float may be adjusted on the rod. The cylinder-cap 10 is provided with a suitable binding-post 13, from which leads a conductor 14. 15 is a depending metal strip in the chamber of the glass cylinder 8, and at its upper end is connected to and held in place by the binding-post screw, as at 16. At its lower end the strip 15 is bent at a right angle, and has therethrough an opening 17 through which the rod 12 may slide without touching the strip. At its top the rod 12 carries a contact-piece 18, adapted to contact with the strip 15 when the float reaches a predetermined point in its downward travel. The binding-post is suitably insulated from the cylinder 7, as at 19, and the rod 12 slides in an insulating guide piece 20, which prevents the rod from accidentally contacting with the strip 15. The wire 14 is connected with a battery or other source of electrical energy, and with a suitable alarm, and is "grounded" on the metal work of the engine.

The operation of my device is as follows: The pipe 4 being connected with the crank-chamber of an engine, and the line 14 being connected as above indicated, the oil in the chamber of the cylinder 1 will stand at the same height as the oil in the crank-chamber of the engine. When the oil in the crank-chamber nears the danger point the float 11 is lowered so that the contact-piece 18 comes in contact with the strip 15 thus closing the circuit through the strip 15, conductor 14, battery, alarm, engine cylinder 1, cap 5 and rod 12, and actuating the alarm. If preferred the alarm may consist of a device for opening the sparking circuit thus stopping the engine until the oil in the crank-chamber is renewed.

Having described my invention, what I claim and desire by Letters Patent is,—

1. In a device of the described character, a metal container adapted and arranged at its lower end for connection with an adjacent crank-chamber, a cap for the container, a glass tube mounted upon said cap, for the glass tube a metal sleeve having therethrough a sight-aperture, a closure for the top of the metal sleeve, a float in the chamber of the container, a vertical rod carried by the float and passing through and contacting with said cap, a binding-post upon said closure and insulated from said sleeve, a metal strip connected with said binding-post and extending downwardly in the glass tube and being bent at an angle at its lower end, a contact-piece carried by the vertical rod near its upper end, the arrangement being such that the descent of the float brings the metal strip and the contact piece together.

2. In a device of the described character, a metal container adapted and arranged at its lower end for connection with an adjacent crank-chamber, a cap for the container, a glass tube mounted upon said cap, for the glass tube a metal sleeve having therethrough a sight-aperture, a closure for the top of the metal sleeve, a float in the chamber of the container, a vertical rod carried by the float and passing through and contacting with said cap, means for the relative adjustment of the float and the rod, a binding-post upon said closure and insulated from said sleeve, a metal strip connected with said binding-post and extending downwardly in the glass tube and being bent at an angle at its lower end, a contact-piece carried by the vertical rod near its upper end, the arrangement being such that the descent of the float brings the metal strip and the contact piece together.

In testimony whereof I affix my signature in presence of two witnesses.

ARTHUR JOSEPH ROUTSON.

Witnesses:
H. A. WERNER,
C. J. HARMAN.

Copies of this patent may be obtained for five cents each, by addressing the "Commissioner of Patents, Washington, D. C."